United States Patent
Wiezoreck

(10) Patent No.: US 8,058,764 B2
(45) Date of Patent: Nov. 15, 2011

(54) WINDING FORMER FOR A SADDLE COIL WINDING

(75) Inventor: Jan Wiezoreck, Bonn (DE)

(73) Assignee: Zenergy Power GmbH, Rheinbach (DE)

(*) Notice: Subject to any disclaimer, the term of this patent is extended or adjusted under 35 U.S.C. 154(b) by 559 days.

(21) Appl. No.: 12/196,482

(22) Filed: Aug. 22, 2008

(65) Prior Publication Data
US 2009/0051241 A1  Feb. 26, 2009

(30) Foreign Application Priority Data
Aug. 23, 2007 (DE) .......................... 10 2007 039 889

(51) Int. Cl.
*H02K 1/00* (2006.01)
*H02K 3/00* (2006.01)
*H02K 17/00* (2006.01)
*H02K 19/00* (2006.01)
*H02K 21/00* (2006.01)
*H02K 23/26* (2006.01)

(52) U.S. Cl. ........... 310/195; 29/602.1; 29/605; 29/606; 335/216; 335/299; 335/300

(58) Field of Classification Search ............... 29/592.1, 29/599, 602.1, 605, 606; 335/216, 299, 300; 310/195
See application file for complete search history.

(56) References Cited

U.S. PATENT DOCUMENTS

| 4,279,944 | A |   | 7/1981 | Laskaris |           |
|-----------|---|---|--------|----------|-----------|
| 5,434,129 | A | * | 7/1995 | Motowidlo et al. | 505/433 |
| 6,842,004 | B2 | * | 1/2005 | Withers et al. | 324/318 |
| 7,215,230 | B2 | * | 5/2007 | Niemann et al. | 335/216 |
| 7,319,327 | B2 | * | 1/2008 | Ryan et al. | 324/318 |

* cited by examiner

*Primary Examiner* — Paul D Kim
(74) *Attorney, Agent, or Firm* — Edell, Shapiro & Finnan, LLC

(57) ABSTRACT

A winding former with a winding support between a first plate and a second plate for a saddle coil winding made up from a thin layer HTSC, which is destined for a cylindrical armature of an electrical machine, and which has two longitudinal legs parallel to the armature axis between two winding ends, wherein the winding support for each winding end has a bearing surface, which enables the thin layer HTSC to be wound to form a saddle coil without damaging the HTSC thin layer.

9 Claims, 5 Drawing Sheets

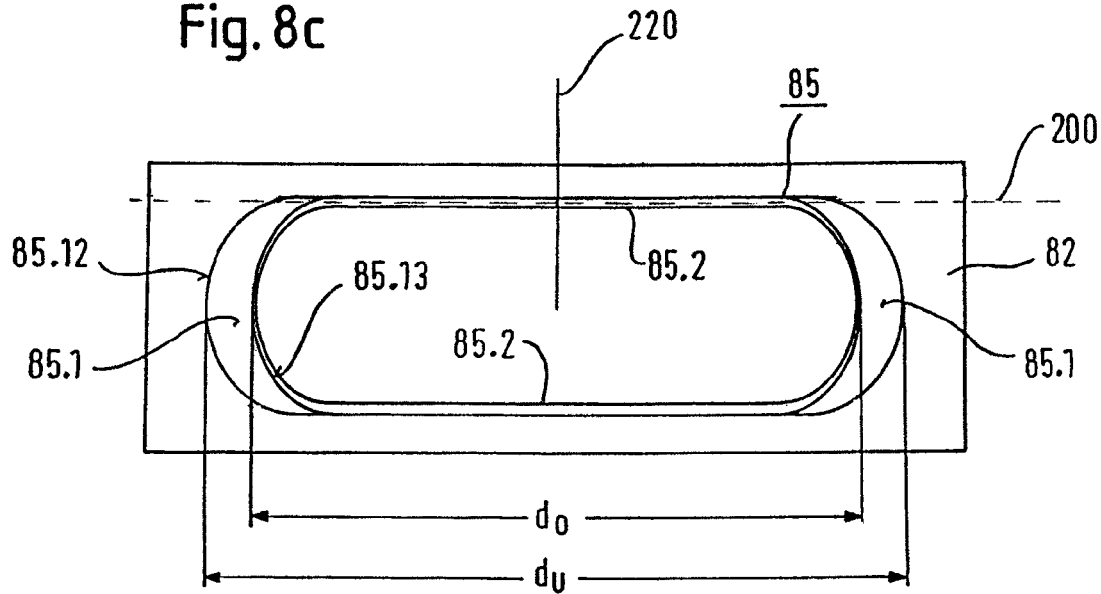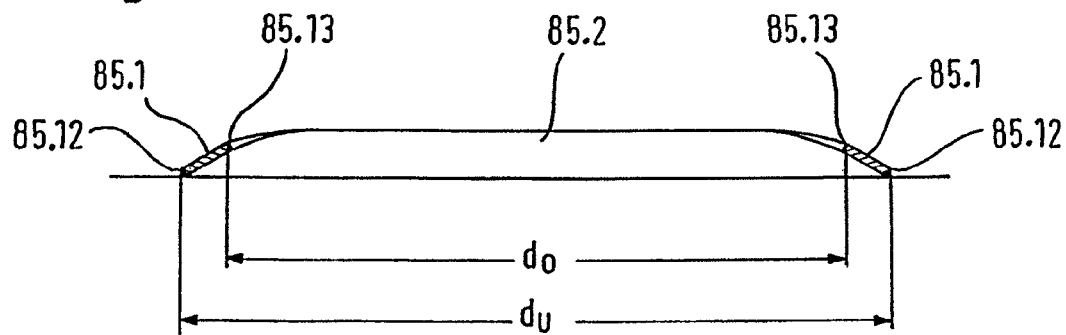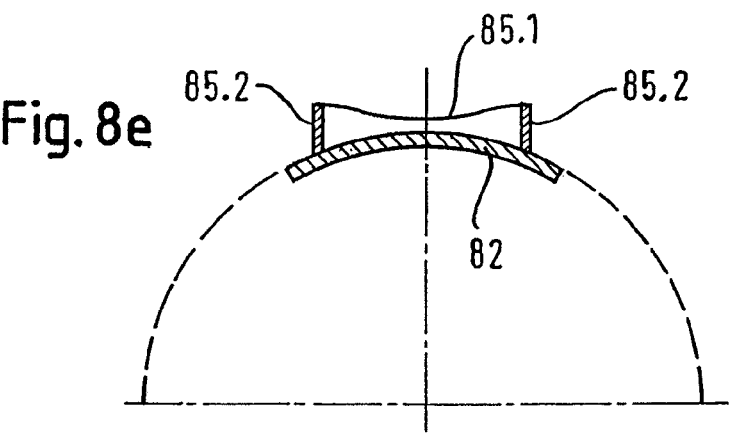

WINDING FORMER FOR A SADDLE COIL WINDING

CROSS REFERENCE TO RELATED APPLICATIONS

This application claims priority under 35 U.S.C. §119 to Application No. DE 102007039889.3 filed on Aug. 23, 2007, entitled "Winding Former for a Saddle Coil Winding," the entire contents of which are hereby incorporated by reference.

FIELD OF THE INVENTION

The invention concerns a winding former with a winding support between a first plate and a second plate for a saddle coil winding made up from a band-shaped thin layer high temperature superconductor (HTSC), which is destined for a cylindrical armature of an electrical machine, such as e.g. an electromotor.

BACKGROUND

Up to the present time saddle coils for the armature or rotor of an electrical machine have been wound from a wire-shaped conductor with a circular cross-section. For manufacturing technology reasons, however, high temperature superconductors are preferably band-shaped, i.e. they have a pronounced rectangular cross-section. As a rule such band-shaped HTSCs consist of a metallic substrate band, onto which is applied a ceramic HTSC thin layer of e.g. $YBa_2Cu_3O_{7-x}$ (YBCO). These HTSCs are also designated as thin layer HTSCs. In contrast to the band-shaped substrate, the ceramic HTSC layer possesses low elasticity; consequently, bending of band-shaped thin layer HTSCs must be minimized, for which reason it is difficult to wind a saddle coil made up from a band-shaped thin layer HTSC onto an armature.

It is generally known art to wind a metallic superconducting racetrack coil into a mould from a winding former between two plane-parallel plates. After the winding process the racetrack coil is firstly cast in the mold and, after hardening, is removed from the mold. This procedure cannot, however, be transferred across to the manufacture of a saddle coil made up from a thin layer HTSC because, during the winding of the winding former, the HTSC layer would be overstretched, i.e., the superconducting thin layer would tear, at least in the upper region of the band, and would at least partially be ruptured.

SUMMARY

The present invention is directed toward a saddle coil winding former operable to manufacture of a saddle coil made up from a thin layer HTSC for an armature of an electrical machine. The saddle coil winding former has a sandwich structure made up from a winding support between a first plate and a second plate. The first plate and the second plate are, at least in the region of the longitudinal leg of the saddle coil winding, hollow cylinder segments matched to the circumference of the armature. Between the two longitudinal legs, the saddle coil has on both sides a winding end. For each of these winding ends, the winding support has a bearing surface for the band-shaped thin layer HTSC. The bearing surfaces are twisted such that the maximum distance separating the upper edges of the two bearing surfaces (measured parallel to the cylinder axis) is smaller than the maximum distance separating the lower edges of the bearing surfaces (measured parallel to the cylinder axis). In this manner, the average curvature of a band-shaped thin layer HTSC wound onto the bearing surface is reduced. This reduction results essentially from the difference between the lengths of the upper edge of a bearing surface and the lower edge of the bearing surface divided by the width of the bearing surface and the average edge length of the two edges. The average curvature preferably corresponds to a value smaller than about 3°/m. It is particularly preferred if the two edges of are equal length, i.e. if the difference of their lengths divided by the width of the band and the average edge length corresponds to a curvature of 0°/m.

The difference of the edge lengths divided by the width of the band specifies the curvature angle in radians. The conversion into the degree scale conforming to SI units is achieved by multiplying by $360/2\pi$. The division of the value thus obtained by the average edge length gives the average curvature in °/m.

As a result of the torsion of the bearing surface, a band-shaped, thin layer HTSC wound onto the winding support is likewise correspondingly twisted. Hence, the band-shaped thin layer HTSC is not deformed, or only minimally deformed, about its axis extending in the direction of the thickness of the substrate band. It has been determined that a band-shaped thin layer HTSC, in fact, twists very well within certain limits about its longitudinal axis, and can also be bent about its crosswise axis, but that a curvature about the axis extending in the direction of the substrate band can be tolerated only within very tight limits, because otherwise the HTSC thin layer on the substrate is damaged, as a result of which the critical current density of the band-shaped thin layer HTSC is severely reduced. As a result of the torsion of the bearing surface and, in turn, the torsion of the band-shaped thin layer HTSC, a deformation of the latter about an axis parallel to this thickness direction is avoided, and the thin layer HTSC can be wound onto the winding former without the HTSC thin layer being damaged.

The two plates of the winding former are preferably concentric with one another, at least in the region of the longitudinal legs.

The distance separating the two plates in the region of the winding ends is preferably smaller than the separation in the region of the longitudinal legs. In this manner, the torsion of the band-shaped thin layer HTSC can be taken into account, i.e., the thin layer HTSC can be defined by the two plates in the region of the winding ends also.

In addition, the winding former can also have bearing surfaces for the longitudinal legs of the saddle coil winding. These can be twisted in a region such that the magnetic flux through the narrow faces of the band-shaped HTSC in this region becomes a maximum, if the longitudinal leg is brought by a rotation of the armature into the region in which the magnetic flux density of the external magnetic field acting on the armature is a maximum. In this manner, the magnetic flux in this region is minimized, i.e., the critical current density through the band-shaped thin layer HTSC is correspondingly increased.

If each plate in the region of the longitudinal leg of the saddle coil winding has a projection beyond the corresponding longitudinal leg, then the band is reliably fixed in this region.

For the lateral constraint of the saddle coil winding, the plates in the region of the projections can have grooves opposing one another, in which sits at least one supporting element for the band-shaped thin layer HTSC.

The winding support in the region of each longitudinal leg of the saddle coil winding preferably has a longitudinal strut, which with two parallel longitudinal edges abuts against the first plate. Via the two longitudinal edges, the longitudinal strut abuts in a defined manner against the first plate and e.g. by means of welding spots can be connected to the latter. The two parallel longitudinal edges are essentially easier to manufacture than a curved surface of a longitudinal leg matched to the curvature of the first plate.

Correspondingly, each of the longitudinal struts on its upper face can have two parallel edges, against which the second plate abuts.

In the case of a winding support with a closed metal band, which with one of its narrow faces abuts against the surface of the first plate, the desired torsion of the bearing surfaces in the region of the winding ends automatically self-adjusts to an appropriately selected length of the metal band, if the metal band is initially fixed just in the region of the two longitudinal legs of the saddle coil winding.

To fix the metal band, its internal face can, e.g., be connected with the surface of the first plate by means of a support.

The winding former as described enables a method for the manufacture of a saddle coil made up from a band-shaped, thin layer HTSC by the winding of the band-shaped thin layer HTSC onto the winding former with a winding machine to form a saddle coil winding. Subsequently the winding former with the saddle coil winding can be extracted from the winding machine. With this configuration, the winding former supports the saddle coil winding.

The thin layer HTSC is preferably fixed, e.g. with a resin, only after it has been extracted from the winding former. This has the advantage that the winding machine is immediately ready for further use; in particular there is no need to wait until the resin has hardened.

The saddle coil extracted from the winding machine, made up from the winding former and the saddle coil winding, can, if necessary after fixing the winding on the winding former, be attached as such onto a cylindrical armature for an electrical machine (e.g., for an electromotor or a generator). The attachment of the saddle coil winding and the absorption of the forces acting on the winding are in this manner greatly simplified. In particular, any damage to the winding that is otherwise lying freely is prevented.

BRIEF DESCRIPTION OF THE DRAWINGS

FIGS. 8a-8e illustrate diagrams of partially assembled winding former in accordance with an embodiment of the invention.

DETAILED DESCRIPTION

Figure 1:
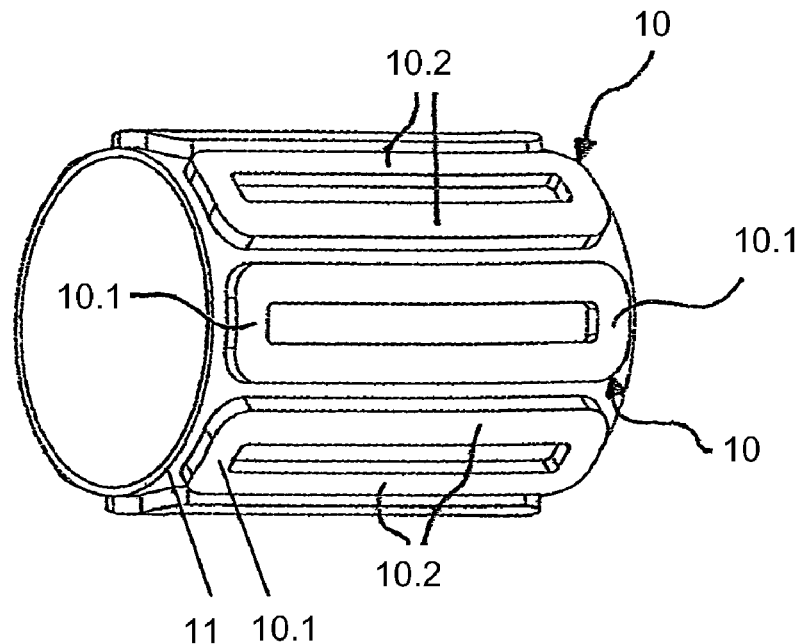
FIG. 1 illustrates an eight-pole armature.

The armature in FIG. 1 has a hollow cylindrical body 11, on which eight saddle coils 10 are arranged equidistantly. Each saddle coil 10 has two winding ends 10.1 and two longitudinal legs 10.2. In the interests of simplicity the connections of the saddle coils 10, their cooling and the bearing arrangement for the armature have been omitted, as have further details concerning the armature.

Figure 2:
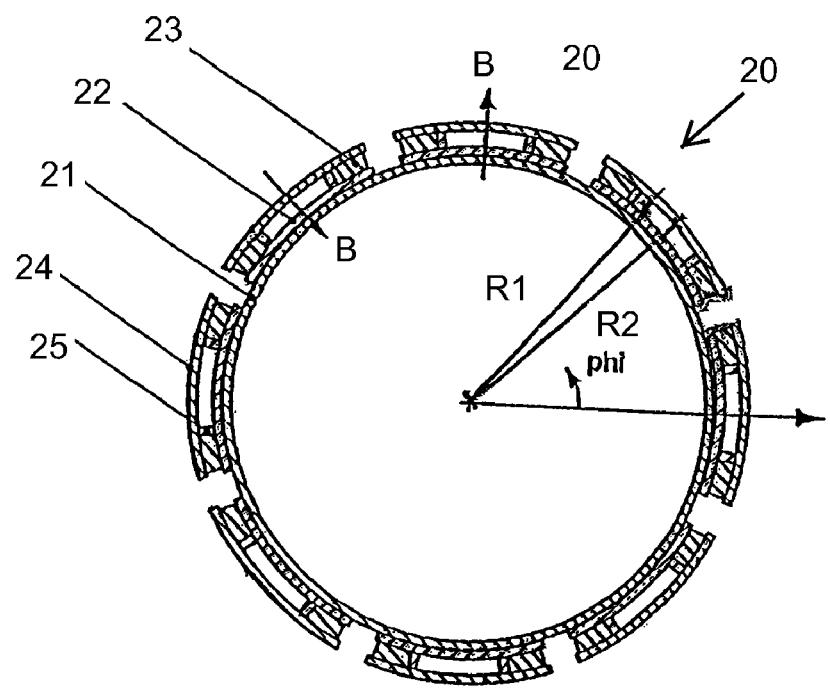
FIG. 2 illustrates in cross-sectional view of the eight-pole armature with saddle coils in accordance with an embodiment of the invention.
Figure 3:
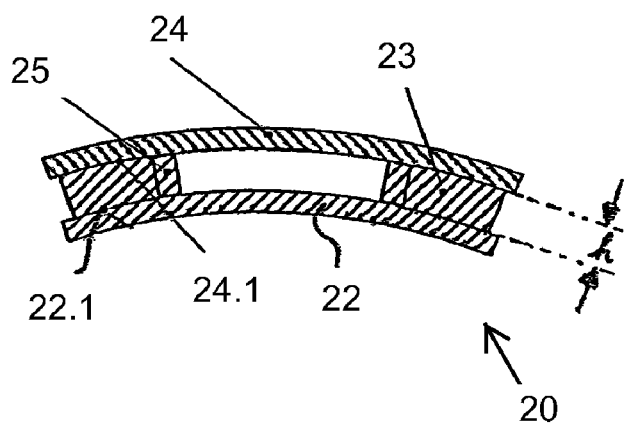
FIG. 3 illustrates a cross-sectional view of a saddle coil of the armature shown in FIG. 2.

FIG. 2 shows a section through an armature as in FIG. 1, but with saddle coils 20 according to the invention. The sectional plane is orthogonal to the axis of rotation and is located in the region of the longitudinal legs of the saddle coils 20. Eight saddle coils 20 are attached to the hollow cylinder 21, and these are represented in FIG. 3 at an enlarged scale. Each of the saddle coils 20 includes of a saddle coil winding former and a saddle coil winding 23 made up from a band-shaped, thin-layer HTSC, which is also designated as an HTSC winding, or just as a winding. The saddle coil winding former has a first plate 22 in the form of a segment of a hollow cylinder matched to the armature, on which a winding support 25 is attached. A second plate 24 is attached to the winding support 25, which likewise has the form of a segment of a hollow cylinder matched to the armature. Each of the two plates 22, 24 project beyond the winding support 25 such that the saddle coil winding former has a circumferential open pocket in which sits the winding 23 made up from a band-shaped thin layer HTSC.

The winding 23 can be fixed to the saddle coil winding former via an impregnating resin (e.g., an epoxy resin). The impregnating resin can, for example, be applied by means of vacuum impregnation after the winding process is complete, or can be brushed onto the band-shaped HTSC during the winding process.

The inner radius R2 of the second plate 24 corresponds to the outer radius R1 of the first plate 22 plus the height h of the winding former 25, such that the pocket for the band-shaped HTSC has a constant thickness. The inner surfaces of the pocket, i.e. the surfaces of the two plates 22, 24 opposing one another are formed in the region of the winding 23 as adhesion surfaces 22.1, 24.1. Forces occurring on the winding can be transferred by means of the adhesion between the winding 23 and the segments 22, 24. Forces are generated on the winding e.g. by the interaction between magnetic field and winding current, and also by the rotation of the armature. The transfer of forces leads to the formation of shear stresses in the winding 23.

Figure 4:
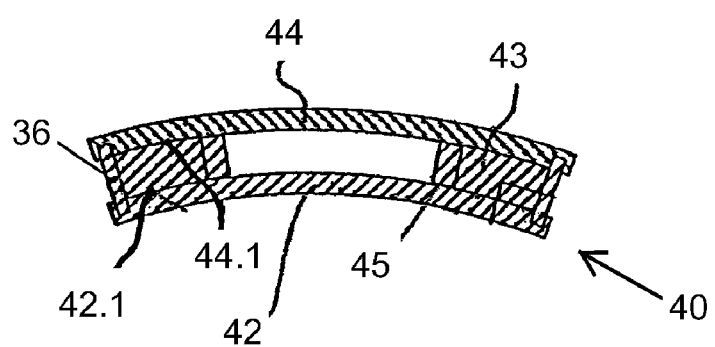
FIG. 4 illustrates a cross-sectional view of a saddle coil in accordance with an embodiment of the invention.

FIG. 4 shows a further form of embodiment of a saddle coil in cross-section. The saddle coil 40 includes a structure similar the saddle coil in FIG. 3, having a first plate 42, a second plate 44, a saddle coil (HTSC) winding 43, and a winding support 45. However, the inner surfaces of the pocket (i.e., the surfaces of the two plates 42, 44 opposing one another) are formed as sliding surfaces 42.1, 44.1 in the region of the winding 43. The sliding surfaces 42.1, 44.1 can be made up from a coating of the appropriate surfaces with a separating agent (e.g., a plastic film, mica insulation, etc). As a result of the sliding surfaces 42.1, 44.1 on the inner surfaces of the pocket only small shear forces are transferred between the winding 43 and the plates 42, 44. This can be advantageous, if otherwise shear forces that were too high would arise in the winding, which would lead to the destruction of the winding. The pocket is closed off by a supporting element 46. For this purpose the two plates 42 and 44 have in their edge region circumferential grooves (without reference symbols) opposing one another. In these grooves sits the supporting element 46, against which the outer face of the HTSC winding 43 abuts. The forces acting on the winding 43 can be directed into the plates 42, 44 via the supporting element 46, without the generation of high shear forces in the winding 43.

Figure 5:
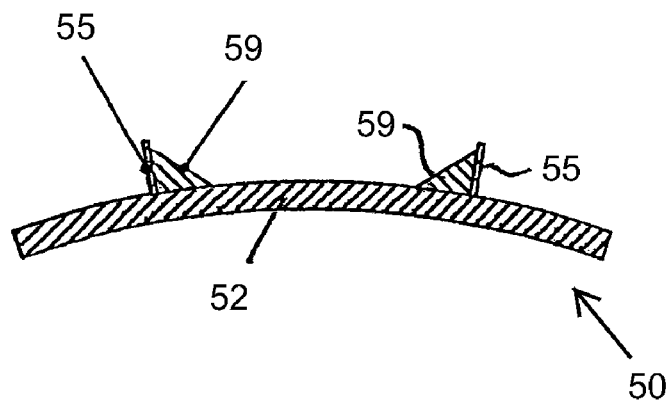
FIG. 5 illustrates a cross-sectional view of a winding former that is partially assembled for clarity.

FIG. 5 shows a partially assembled saddle coil winding former 50 with a first plate 52 in the form of a hollow cylinder segment, on which is attached a metal band, oval-shaped in plan view, as a winding support 55. The oval-shaped metal band is initially attached to the first plate 52 in the region of its longitudinal leg on its inner surface with approximately triangular supports 59. By matching the closed metal band to the curvature of the first plate the desired torsion of the metal band automatically self-adjusts in the region of the rounded end regions of the oval-shaped metal band. The saddle coil winding former 50 is supplemented by a second plate in the form of a hollow cylinder segment (not represented).

Figure 6:
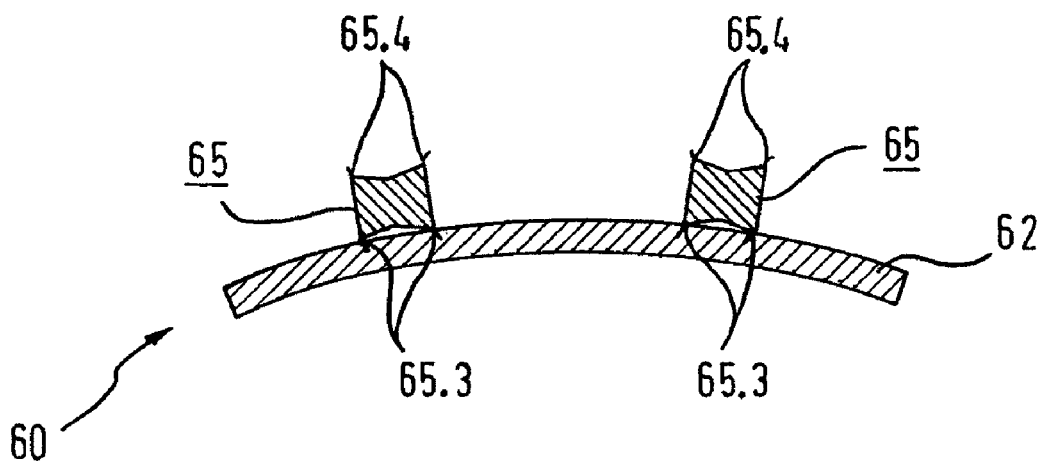
FIG. 6 illustrates cross-sectional view of partially assembled winding former in accordance with an embodiment of the invention.

The partially assembled form of embodiment of a saddle coil winding former 60 shown in FIG. 6 has a first plate 62 in the form of a hollow cylinder segment, on which a winding support 65 is attached. In contrast to the winding supports 25, 45 in FIG. 3 and FIG. 4 respectively the winding support 65 in the region of the longitudinal leg of the saddle coil winding does not lie flat against the first plate 62, but has a bi-concave cross-section and as a result two parallel lower edges 65.3 and also two parallel upper edges 65.4. The winding support 65 therefore abuts against the first segment 62 in line contacts only and can to a large extent be attached to the latter independently of the curvature of the first plate 62, as a result of which the longitudinal legs of the winding support 65 can be used for a multiplicity of saddle coil winding formers. Correspondingly, a second plate in the form of a hollow cylinder segment (not illustrated) can also be attached simply and securely onto the parallel upper edges 65.4 of the winding support 65.

Figure 7:
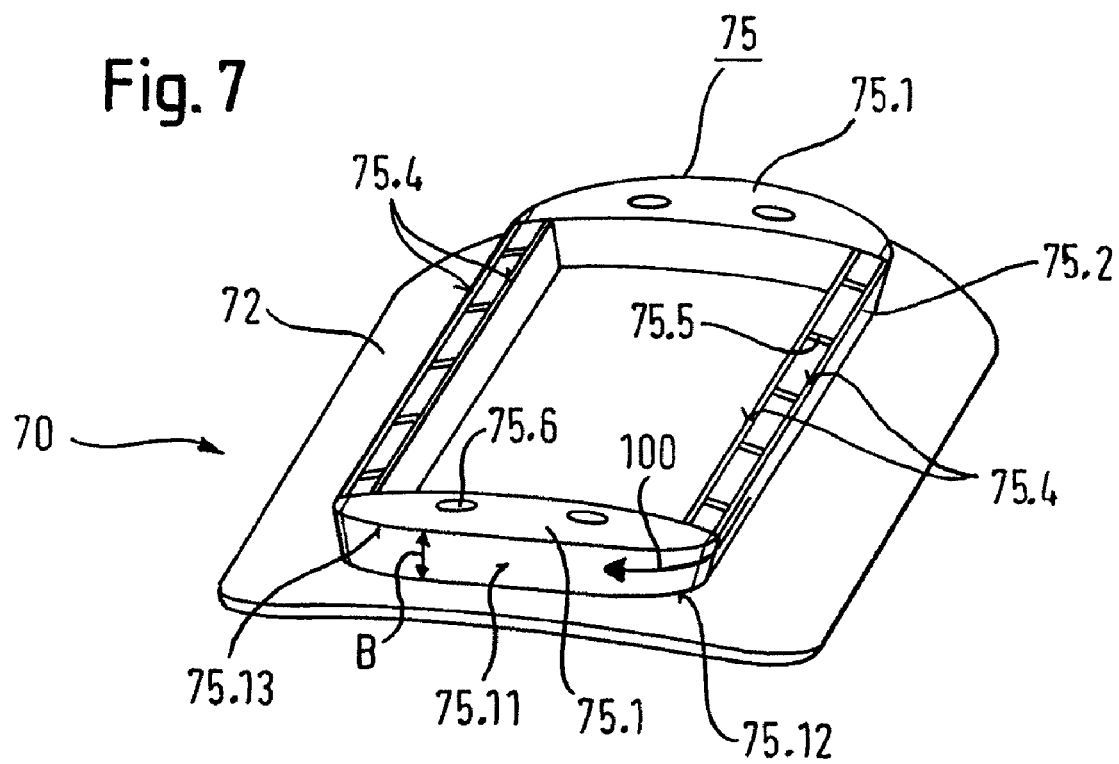
FIG. 7 illustrates a perspective view of a partially assembled winding former in accordance with an embodiment of the invention.
Figure 8A:
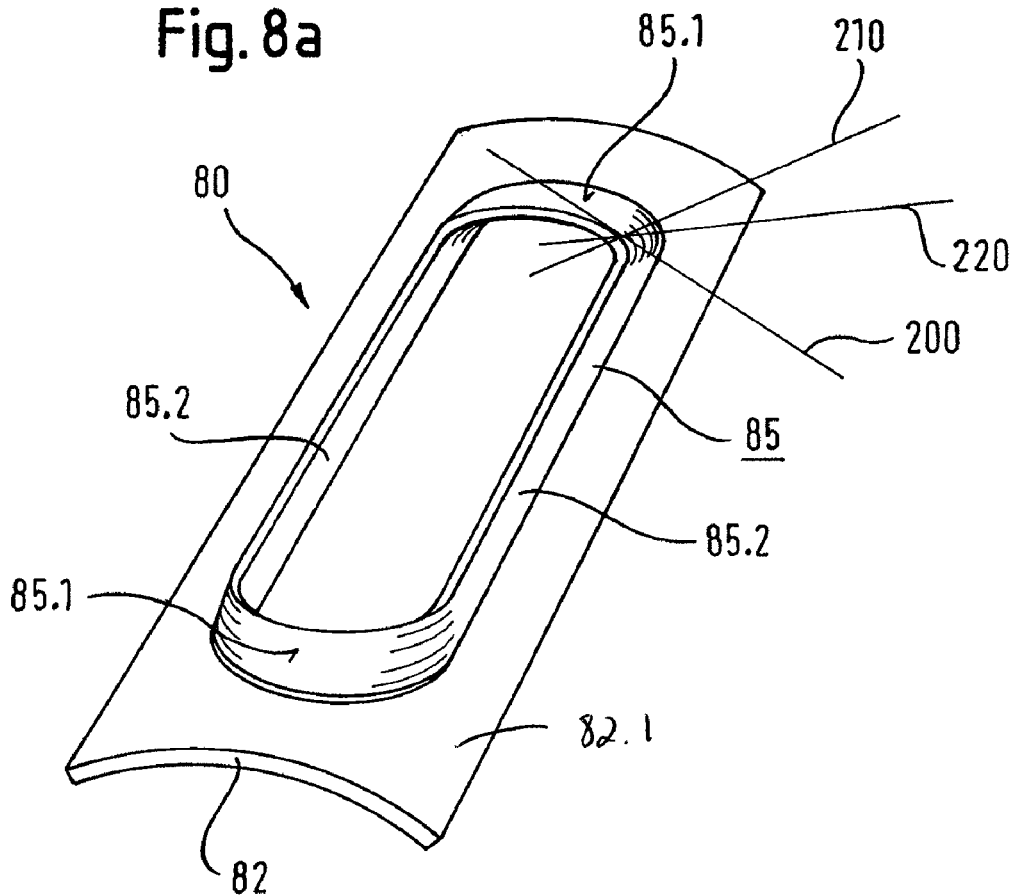
Figure 8B:
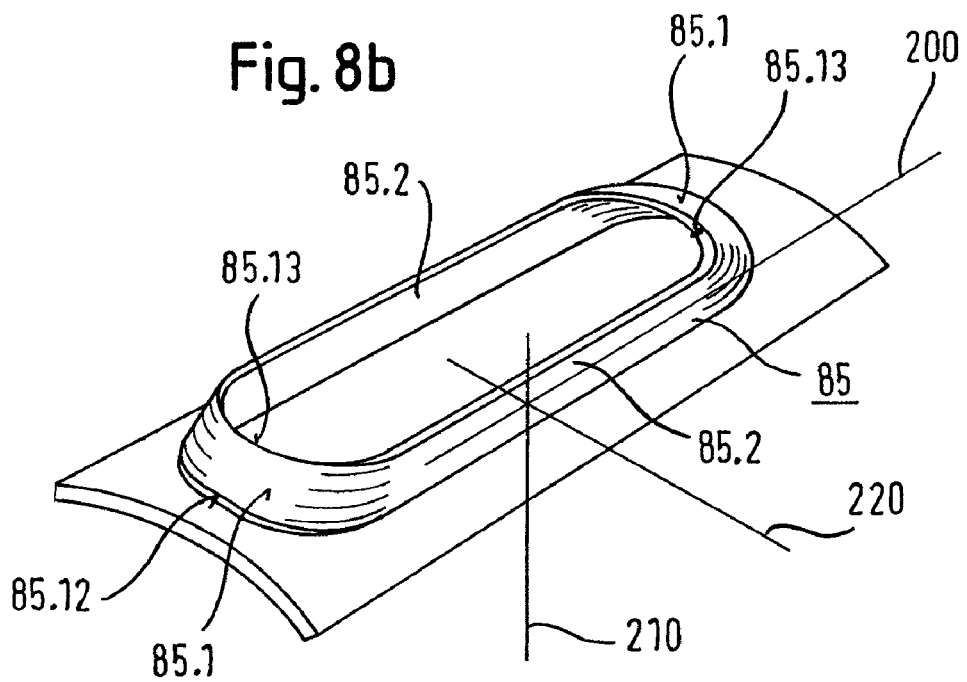

FIG. 7 shows a further partially assembled saddle coil winding former 70. As illustrated, a first plate 72 is represented in the form of a hollow cylinder segment, on which a winding support 75 is attached. The winding support 75 is in several parts and has two end pieces 75.1. The end pieces 75.1 abut against the first plate 72 in a form fit. Between the two end pieces two longitudinal struts 75.2 act as bearing surfaces for the longitudinal legs of the winding (omitted for clarity). Each of the upper faces of the longitudinal struts 75.2 has a recess extending in the longitudinal direction with an approximately trapezoidal cross-section (only indicated). Correspondingly each longitudinal strut 75.2 has two upper lying edges 75.4 on which can be attached a second plate (not illustrated) in the form of a hollow cylinder segment. The non-visible lower face of the longitudinal struts 75.2 likewise has an approximately trapezoidal recess such that each of the two longitudinal struts 75.2 abut with two edges against the first plate 72. To attach the longitudinal struts 75.2 between the first plate 72 and the second plate, not represented, each longitudinal strut 75.2 has a series of recesses 75.5 in order to bolt the two plates together through the longitudinal struts 75.2. Corresponding recesses 75.6 are also located in the two end pieces 75.1.

Each of the two end pieces 75.1 has a bearing surface 75.11 for the winding end (not shown) of a saddle coil winding made up from a band-shaped thin layer HTSC. The bearing surfaces 75.11 have a width B that is matched to the width of the thin layer HTSC. The arrow 100 specifies the band direction. The bearing surface 75.11 is twisted in the band direction 100 such that, despite the curvature of the first plate 72 and the second plate, the lower edge 75.12 of the bearing surface 75.11, i.e., the edge of the bearing surface 75.11 lying nearer to the cylinder axis of the armature, has the same length as the upper edge 75.13 of the bearing surface 75.11. Correspondingly the maximum distance separating the two upper edges 75.13 measured parallel to the cylinder axis is smaller than the corresponding distance separating the two lower edges 75.12. A band-shaped thin layer HTSC wound onto the winding former is accordingly simply twisted in the direction of the band, and is curved at right angles to the direction of the band, i.e. about an axis parallel to the width B. The curvature of the band about the axis indicating the direction of the thickness of the winding former 75 is so small that the HTSC thin layer of a band-shaped thin layer HTSC is not damaged as a result.

The torsion of the bearing surfaces in the region of the winding ends can be particularly well recognized with the aid of the diagrams FIGS. 8a to 8e. The diagrams show a partially assembled saddle coil winding former 80 with a first plate 82 in the form of a hollow cylinder segment, on which an approximately oval metal band is attached as a winding support 85. In the region of the longitudinal legs 85.2 of the oval the winding support 85 is oriented at a constant angle to the surface of the first plate 82 (cf. FIG. 8e). In a manner other than as represented the winding support 85 in the region of the longitudinal leg 85.2 can also be attached orthogonally to the surface 82.1 of the first plate 82, shaped as a hollow cylinder segment (cf. FIG. 5). Bearing surfaces 85.1 for the winding ends of a saddle coil are located between the two longitudinal legs. In the region of the bearing surfaces 85.1 the band-shaped winding support 85 is twisted about its longitudinal axis (as indicated by the straight line 200) and bent about its cross-wise axis (as indicated by the straight line 210), but is not curved about its axis extending in the direction of the thickness of the band-shaped winding support (as indicated by the straight line 220) (cf. FIGS. 8a to 8c). Thus the maximum distance $d_O$ separating the two upper edges 85.13 of the two bearing surfaces 85.1 measured parallel to the cylinder axis of each winding end of the saddle coil winding is smaller than the corresponding distance $d_U$ separating the two lower edges 85.12.

If a band-shaped thin layer HTSC is wound on the winding support 85, the latter thus lies against the winding support 85 and is therefore not bent about its axis extending in the direction of the thickness of the band, i.e. the HTSC thin layer on the substrate is not damaged. Before the band-shaped thin layer HTSC can be wound onto the winding former 80 the band-shaped winding support 85 is braced by means of struts, as shown in FIG. 5. In addition, needless to say, a second plate is attached to the winding support 85, as shown in FIG. 3 and FIG. 4.

What is claimed is:

1. A winding former for a high temperature superconductor (HTSC) saddle coil winding disposed on a cylindrical armature of an electrical machine, the armature having an armature circumference and an armature axis, the winding former comprising:

a HTSC saddle coil winding formed from band-shaped HTSC, the saddle coil winding including:
a first winding end,
a second winding end, and
two longitudinal legs disposed between the winding ends, wherein the longitudinal legs are oriented parallel to the armature axis;
a first plate disposed under the HTSC saddle coil winding and a second plate disposed over the HTSC saddle coil winding; and
a winding support oriented between the first plate and the second plate, wherein the winding support has a bearing surface for each winding end, wherein the first plate and the second plate comprise hollow cylinder segments shaped to match to the armature circumference in the region of the longitudinal legs, and wherein each bearing surface for a respective winding end is twisted such that a maximum distance ($d_o$) separating upper edges of the bearing surfaces measured parallel to a cylinder axis is smaller than a maximum distance ($d_u$) separating lower edges of the bearing surfaces measured parallel to the cylinder axis.

2. The winding former according to claim 1, the first and second plates are concentric with one another, at least in the region of the longitudinal legs.

3. The winding former according to claim 1, wherein:
the winding former further comprises bearing surfaces for the longitudinal legs; and
at least one of the longitudinal leg bearing surfaces is twisted in at least one region such that magnetic flux through narrow faces of the band-shaped HTSC in the twisted region becomes a maximum when, by a rotation of the armature, the longitudinal leg is brought into the region in which the magnetic flux density of the external magnetic field acting on the armature is a maximum.

4. The winding former according claim 1, wherein each plate in the region of the longitudinal legs of the saddle coil winding includes a projection beyond the corresponding longitudinal leg.

5. The winding former according to claim 4, wherein:
the plates in the region of the projections have grooves opposing one another; and
at least one supporting element operable to laterally constrain the saddle coil winding is positioned within the opposed grooves.

6. The winding former according to claim 1, wherein the winding former in the region of each longitudinal leg of the saddle coil winding has a longitudinal strut, which, in cooperating with two longitudinal edges, abuts against the first plate.

7. The winding former according to claim 1, wherein:
the winding former in the region of each longitudinal leg of the saddle coil winding comprises a longitudinal strut with an upper face including two longitudinal edges; and
the second plate abuts the two longitudinal edges.

8. The winding former according to claim 1, wherein the winding support comprises a closed metal band having narrow faces, wherein one of the narrow faces of the metal band abuts against the surface of the first plate.

9. The winding former according to claim 8, wherein the surface of the first plate is coupled to an inner face of the metal band via a strut.

* * * * *